US010666827B1

(12) United States Patent
Yoshidome

(10) Patent No.: US 10,666,827 B1
(45) Date of Patent: May 26, 2020

(54) SCANNING OF DOCUMENT-ADHERED REMOVABLE NOTES INDIVIDUATED FROM THEIR DOCUMENTS

(71) Applicant: Kyocera Document Solutions Inc., Osaka (JP)

(72) Inventor: Gin Yoshidome, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/455,497

(22) Filed: Jun. 27, 2019

(51) Int. Cl.
*H04N 1/00* (2006.01)
*H04N 1/04* (2006.01)

(52) U.S. Cl.
CPC ....... *H04N 1/0464* (2013.01); *H04N 1/00413* (2013.01); *H04N 1/00474* (2013.01); *H04N 1/00588* (2013.01); *H04N 1/00602* (2013.01); *H04N 1/00649* (2013.01); *H04N 1/00689* (2013.01); *H04N 1/00702* (2013.01); *H04N 1/00734* (2013.01); *H04N 1/00748* (2013.01); *H04N 2201/0094* (2013.01)

(58) Field of Classification Search
CPC ............. H04N 1/0464; H04N 1/00734; H04N 1/00689; H04N 1/00748; H04N 1/00474; H04N 1/00413; H04N 1/00649; H04N 1/00602; H04N 1/00702; H04N 2201/0094; H04N 1/00567; H04N 1/00588; H04N 1/00681; H04N 1/00742; H04N 1/00745
See application file for complete search history.

(56) References Cited

U.S. PATENT DOCUMENTS

| 9,560,222 | B2 * | 1/2017 | Nakao ................. H04N 1/00336 |
| 9,695,006 | B1 | 7/2017 | Yoshidome |
| 2015/0207948 | A1 * | 7/2015 | Yamaguchi ............ H04N 1/387 358/452 |

* cited by examiner

*Primary Examiner* — Kent Yip
(74) *Attorney, Agent, or Firm* — James Judge

(57) ABSTRACT

Note sheets, having opposite free and adhesive edges, removably attached to documents are individuated and scanned. A document-edge bearing device shifts away from a document to allow the document's edge nearest its note sheet's free edge to droop under its own weight and open a free-edge-document gap. A scanning control unit situates into the gap a note-wedging guide component of a pivotal scanning device carried on a note-targeting platform, and having a note-sheet scanner and rollers for moving a removable note sheet across the scanner, both to peel the note sheet off its document, and to scan the note sheet. In a note-sheet presence/position detecting mechanism, document-edge pressing sliders wrinkle a document, and a control-linked sensor detects a shading-difference-originating gap between the free edge of any removable note sheet, and the document to which it is attached, to determine physical presence and document-relative position of the note sheet.

15 Claims, 12 Drawing Sheets

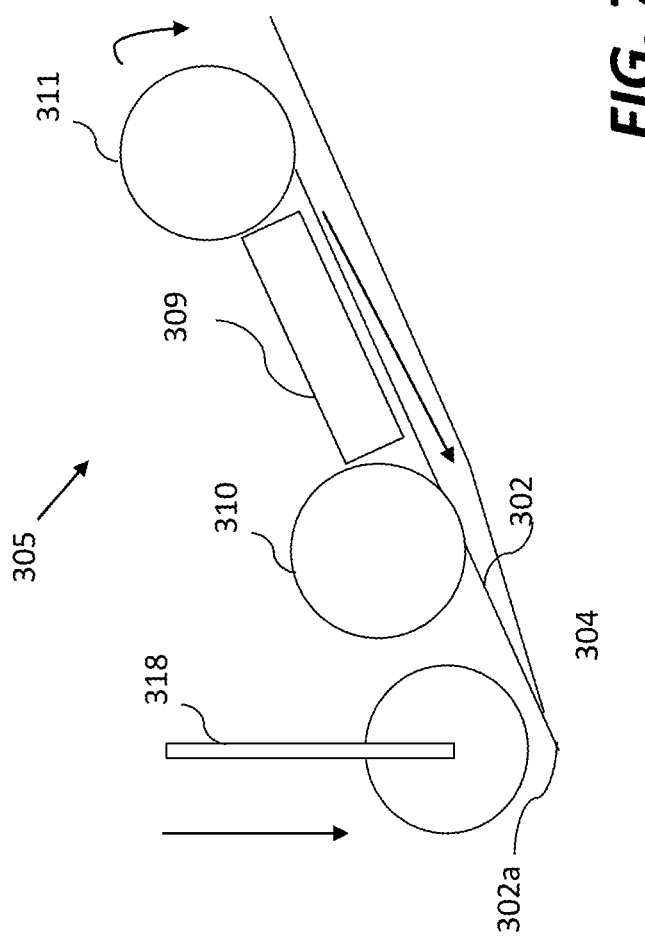

SCANNING OF DOCUMENT-ADHERED REMOVABLE NOTES INDIVIDUATED FROM THEIR DOCUMENTS

BACKGROUND

Technical Field

The present disclosure relates to handling of thin material sheets to which detachable components are adhered and to the electronic scanning of information from such sheets, and more particularly relates to automated removal of, and electronic scanning of information from, note sheets removably attached to documents.

Description of the Related Art

Paper documents are still the medium of choice for conveying and sharing information in many professional situations, whether it be for reasons of readability, security, freedom from device-dependence, or for any number of other reasons. Paper documents are often reviewed by those with an interest in the content of the documents, who may accordingly write comments in reference to the documents on removable note sheets they stick to the information-containing side of a given page or pages of the documents. An example of such note sheets is paper notes with a self-adhesive strip such as the well-known POST-IT® notes. Such notes will be referred to as "sticky notes" hereinafter.

Digitalizing document-processing of printed documents is carried out for any number of purposes, such as archival storage and either private or public electronic distribution. New-hire and payroll processing, invoice processing, hospital records processing, processing of certain bank documents, legal discovery, and bibliographical data-based archiving of documents, for example, may involve review of the documents by specialists who make and append to given documents sticky notes containing specific, handwritten comments on the documents. Digitalization of the printed documents in such instances can mandate scanning not only the documents per se, but also the sticky notes as well, to ensure that the information contained on the sticky notes is archived, and available for review or for legal evidentiary purposes.

Currently, however, digitalizing a document to which a sticky note is attached is a cumbersome, laborious process involving manually removing the sticky note, scanning the original document, scanning the sticky note as an independent, separately stored electronic document, and in many cases attaching the sticky note back onto the document. These drawbacks are exacerbated in situations, such as described above, entailing the digitalization of a large number of documents containing such sticky notes.

SUMMARY

In consideration of the above-discussed issues, an object of the presently disclosed technology is a scanning unit, an image forming apparatus, and a scanning method, enabled to automatically remove sticky notes from documents, scan the documents and sticky notes individually, optionally adhere the sticky notes back onto the documents, and makes the contents of the sticky notes readily available to users.

In accordance with various embodiments of the presently disclosed technology, sticky-note remove/scan/reattach-enabled scanning units, sticky-note remove/scan/reattach-enabled sheet-fed scanning systems, and multifunction peripherals comprising such scanning units and sheet-fed scanning systems are made available. In some embodiments the presently disclosed technology affords a scanning unit for scanning a document received therein, the document having a note detachably attached thereto. The scanning unit includes a pivotal scanning device that is configured to rotate around a pivot point and includes a note-sheet scanner, first and second rollers, each configured to rotate at a predefined speed in a predefined direction, and move the document across the note-sheet scanner. The scanning unit further includes a document-edge bearing device configured to move a first edge of the document in a vertical direction, the first edge being disposed substantially parallel to a non-adhesive edge of the note, and a scanning control unit coupled to the scanner, first and second rollers, and the document-edge bearing device. The scanning control unit is configured to enable the note-sheet scanner to scan the document received therein, move the document-edge bearing device in a vertically downward direction based on a position of the note in the scanned document, wherein the vertical downward motion of the document-edge bearing device positions the first edge in a curved position, thereby widening a gap between the non-adhesive edge of the note and the document and exposing the non-adhesive edge, rotate the first and second rollers in a first direction to pull the non-adhesive edge of the note towards the note-sheet scanner, rotate the pivotal scanning device in a direction away from the first edge, wherein simultaneous rotation of the first and second rollers, and of the pivotal scanning device facilitates detaching the adhesive edge of the note from the document, and enable the note-sheet scanner to scan the detached note separately from the document.

Other embodiments of the presently disclosed technology afford a sheet-fed scanning system for scanning documents having note features, the note features including removable note sheets document-attached along an adhesive edge of the removable note sheet and having a free edge opposite the adhesive edge thereof, and printed images of note sheets, the sheet-fed scanning system comprising: a document-carrying platen; a note detection assembly for distinguishing whether a note feature on a document is a physically separate, removably attached note sheet or is a printed image, the note detection assembly including a document-sheet wrinkling mechanism having at least one sheet-wrinkling slider disposed unilaterally along the platen for unilaterally sliding against a document carried on the platen to wrinkle the document so as to create an arch in the document, thereby forming a shading-difference-originating gap between the free edge of any removable note sheet attached to the document, and an opposing surface of the document, and a sensor for detecting a gap-originated shading difference between an edge of an area of contrast detectable as a note feature on a document, and a predetermined region surrounding the note feature, wherein the sensor determines position of the note feature relative to the document widthwise and lengthwise and outputs the determination as note-sheet position information; and a scanning unit including a note-targeting platform disposed over the platen and mounted on a support arm translatable widthwise and lengthwise with respect to the document, and enabled to swivel in a plane parallel to the document, a pivotal scanning device carried pivotably on the note-targeting platform to pivot in a plane perpendicular to a document, the pivotal scanning device including a note-sheet scanner, first and second rollers rotatably disposed on opposing lateral sides of the note-sheet scanner, each enabled to rotate at a predefined speed in a predefined direction, to move a removable note sheet across the note-sheet scanner, and a note-wedging guide carrying the note-sheet scanner and the first and second rollers, the note-wedging guide having a leading edge, a document-edge bearing device for bearing an edge of a document nearest the free edge of a removable note sheet, the document-edge bearing device being shiftable perpendicularly away from the document with respect to the document, and a scanning control unit control-operatively linked to the sensor, and to the note-targeting platform and the pivotal scanning device, for controlling according to the note-sheet position information the translating and swiveling of the note-targeting platform relative to the document, for controlling the pivoting of the pivotal scanning device, and for controlling the note-sheet scanner, and first and second rollers, and the scanning control unit further being control-operatively linked to the document-edge bearing device, wherein the scanning control unit is configured to shift the document-edge bearing device perpendicularly away from a document to allow the edge of the document nearest the free edge of the removable note sheet to droop under its own weight and open a gap between the free edge of the removable note sheet and the document, exposing the free edge, based on the note-sheet position information from the scanning hardware, translate and swivel the note-targeting platform to situate the leading edge of the note-wedging guide in the gap between the free edge of the removable note sheet and the document, further translate and swivel the note-targeting platform to move the note-wedging guide under the removable note sheet, while rotating the first and second rollers in a first direction, to catch the free edge of the removable note sheet between the first and second rollers and the note-wedging guide and pull the removable note sheet towards the note-sheet scanner, pivot the pivotal scanning device, while continuing to rotate the first and second rollers in the first direction, to pull the removable note sheet away from the document and peel the adhesive edge of the removable note sheet off of the document, detaching the removable note sheet from the document, and operate the note-sheet scanner while further rotating the first and second rollers, to scan the entirety of the detached removable note sheet.

According to yet other embodiments of the presently disclosed technology, there is provided a multifunction peripheral that includes an image forming unit including at least one of a scanning unit, a copying unit, and a printing unit, wherein the scanning unit is configured to scan a document that has a note detachably attached thereto. The scanning unit comprises a pivotal scanning device that is configured to rotate around a pivot point and includes a note-sheet scanner, and first and second rollers, each configured to rotate at a predefined speed in a predefined direction, and move the document across the note-sheet scanner. The scanning unit further includes a third roller, a document-edge bearing device configured to move a first edge of the document in a vertical direction, the first edge being disposed substantially parallel to a non-adhesive edge of the note, and a scanning control unit coupled to the scanner, first, second and third rollers, and the document-edge bearing device. The scanning control unit is configured to enable the scanner to scan the document received therein, move the document-edge bearing device in a vertically downward direction based on a position of the note in the scanned document, wherein the vertical downward motion of the document-edge bearing device positions the first edge in a curved position, thereby widening a gap between the non-adhesive edge of the note and the document and exposing the non-adhesive edge, rotate the first and second rollers in a first direction to pull the non-adhesive edge of the note towards the scanner, rotate the pivotal scanning device in a direction away from the first edge, wherein simultaneous rotation of the first and second rollers, and of the pivotal scanning device facilitates detaching the adhesive edge of the note from the document, enable the note-sheet scanner to scan the detached note separately from the document, rotate the first and second rollers in a second direction opposite to the first direction to place the note on an original position on the detached document, when the scanning of the detached note and document is finished, and enable the third roller to press the adhesive edge of the note onto the detached document to reattach the note to the document.

The presently disclosed technology also comprehends a method for scanning a document that has a note detachably attached thereto, when the document is received by a scanning unit of an image forming apparatus. The method includes scanning the document with the note, by the scanning unit, receiving a user selection regarding scanning the note separately from the document, via a user interface of the image forming apparatus, automatically detaching the note from the document, by the scanning unit, scanning the detached note separately from the document, by the scanning unit, receiving a user selection regarding reattaching the note to the detached document, via a user interface of the image forming apparatus, and automatically reattaching the note to the document at an original position of the note on the document, by the scanning unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 7 is a schematic sectional diagram depicting a retractable presser roller in place to pressure-roll on the adhesive edge of a detached removable note being replaced into its original position on a document by the pivotal scanning device;

DETAILED DESCRIPTION

Figure 1:
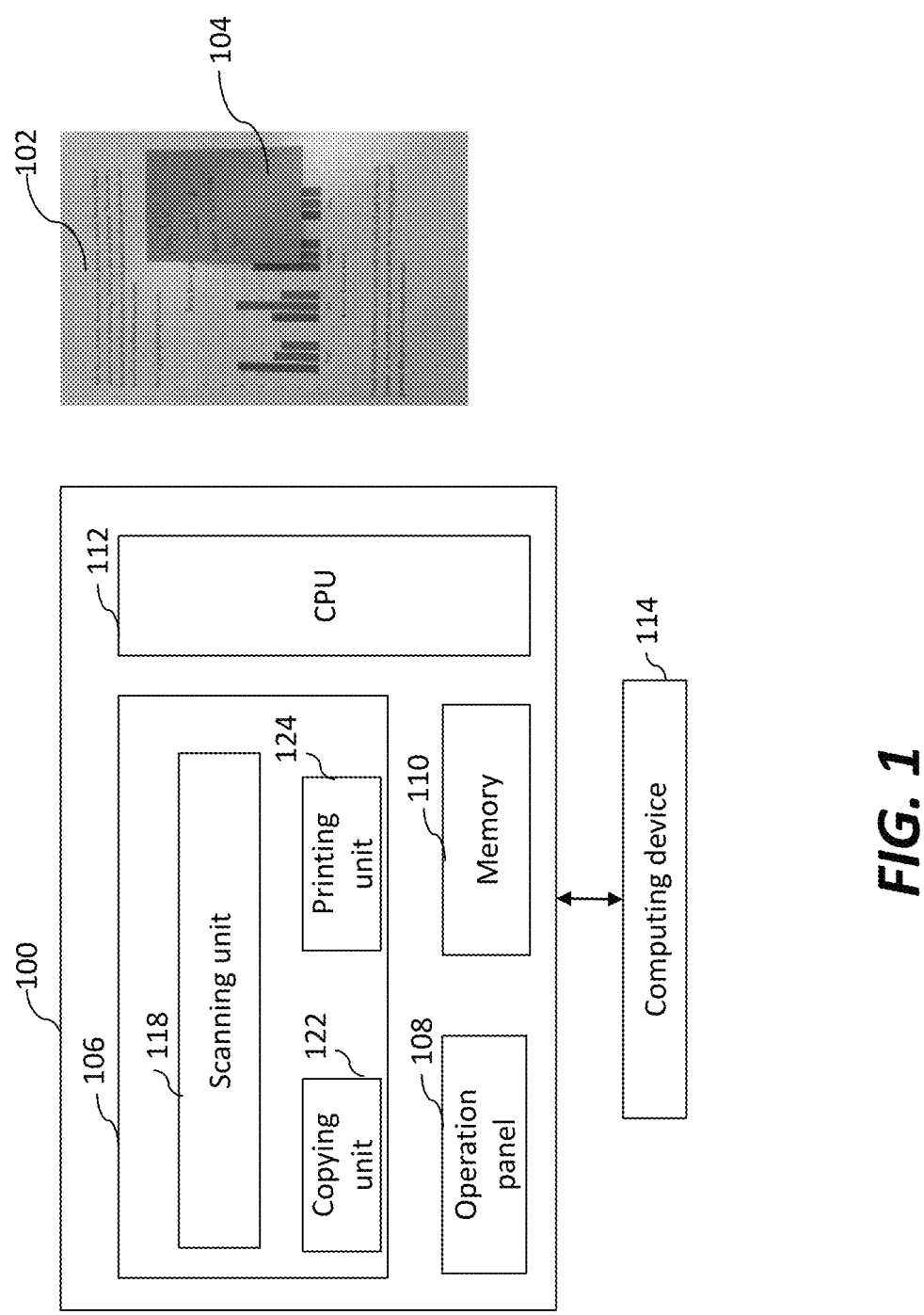
FIG. 1 is a block diagram of an image forming apparatus equipped with a special scanning unit in accordance with embodiments of the presently disclosed technology, for scanning, in separate operations, a document and a detachable note ("sticky note") attached to the document, wherein the figure includes an exemplary illustration of a document with an attached sticky note.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 comprises a block diagram representing components and features, in accordance with embodiments of the presently disclosed technology, of an image forming apparatus 100 enabled both to scan a document 102 and to scan, separately from its scanning of the document 102, a sticky note 104 detachably attached to the document 102. The document 102 with its attached sticky note are also illustrated in the figure, which additionally represents a computing device 114, optionally linked to the image forming apparatus 100 for user access to and control of the image forming apparatus 100. An example of the sticky note 104 is a POST-IT® note or similar paper note with a self-adhesive strip. Hereinafter the sticky note 104 will be referred to simply as note 104.

The image forming apparatus 100 includes an image forming unit 106, an operation panel 108, a memory 110, and a central processing unit (CPU) 112. The user computing device 114 may be connected to the image forming apparatus 100 either through a wired connection, or through a wireless communication network. Examples of the user computing device 114 includes a smartphone, a personal computer, a laptop, and the like. The user computing device 114 enables the user/operator to view the scanned documents, give scanning commands, and provide scanning preferences.

The image forming unit 106 includes a scanning unit 118, a copying unit 122, and a printing unit 124. The imaging forming unit 106 may be hereinafter also referred to as a multifunction peripheral (MFP), as it provides the functions of scanning, copying and printing. Other functions, such as facsimile functions, may also be included, and one or more functions may be excluded, as well.

The operation panel 108 is a user interface for the image forming apparatus 100 and may take the form of a physical keypad or touchscreen. The operation panel 108 may receive inputs from one or more users relating to selected functions, preferences, and/or authentication, and may provide and/or receive inputs visually and/or audibly.

The CPU 112 is a processor, computer, microcontroller, or other circuitry that controls the operations of various components such as the image forming unit 106, the operation panel 108, and the memory 110. The CPU 112 may execute software, firmware, and/or other instructions, for example, that are stored in a volatile or nonvolatile memory, such as the memory 110, or otherwise provided to the CPU 112. The CPU 112 may be connected to the image forming unit 106, the operation panel 108, and the memory 110, through wired or wireless connections, such as one or more system buses, cables, or other interfaces.

The memory 110, in addition to storing instructions and/or data for use by the CPU 112 in managing operation of the image forming apparatus 100, may also include user information associated with one or more users of the image forming apparatus 100. For example, the user information may include authentication information (e.g. username/password pairs), user preferences, and other user-specific information. The CPU 112 may access this data to assist in providing control functions (e.g. transmitting and/or receiving one or more control signals) related to operation of the image forming unit 106.

In operating the scanning unit 118, a user places the document 102 with the note 104 either on a platen glass of the scanning unit 118, or in a document feeder of the scanning unit 118. In some embodiments, the operation panel 108 may be configured to ask the user upon detection of the document 102, by suitably disposed, not-illustrated sensor(s) operatively connected to a below-described scanning control unit 308, "Document(s) include sticky note(s)?" In similar but alternative embodiments, the operation panel 108 may include a <Sticky Note> icon, which the user may press to receive options regarding scanning of the note 104.

Therein, as well as in implementations without the just-described detecting of document presence and operation-panel-based querying of a user, the scanning unit 118 is configured to scan the document 102 with the note 104, and either save a scanned copy of scanned-document data in the memory 110, or send it to the computing device 114. The scanning control unit 308 is configured to carry out a process of determining the position of the note 104 in the scanned document 102 based on the scanned-document data, but this process may at the same time serve to detect presence of the note 102 on the document 104. That is, in certain implementations of the presently disclosed technology, the process of detecting the position of the note relative to the document is achieved through an OCR analysis of the scanned-document data. Not only the relative location, but the presence itself, of the rectangular form of the note may be determined, for example, by recognition of a contrast in hue between the area that the note occupies, and the surrounding region of the document. Nevertheless, this detecting of position of the note 104 may be executed upon the scanning control unit 308 receiving advance user affirmation that a sticky note is present on the document 102.

Furthermore therein, the image forming apparatus 100 may be configured to have the operation panel 108 then ask the user "Scan note(s) separately from document(s)?" As will be described below, the scanning unit 118 is enabled to detach the note 104 from the document 102, and scan the detached note 104 separately from the document 102. The carrying out of this function by the scanning unit 118 may be made conditional on the user saying "yes" to the query just mentioned.

The operation panel 108 may be configured to ask user, upon the scanning of the note 104, "Reattach note to document?" As will additionally be described below, the scanning unit 118 is enabled to reattach the note 104 to the document 102 at the original position of the note 104 on the document 102. The carrying out of this function by the scanning unit 118 may be made conditional on the user saying "yes" to the query just mentioned.

Figure 2:
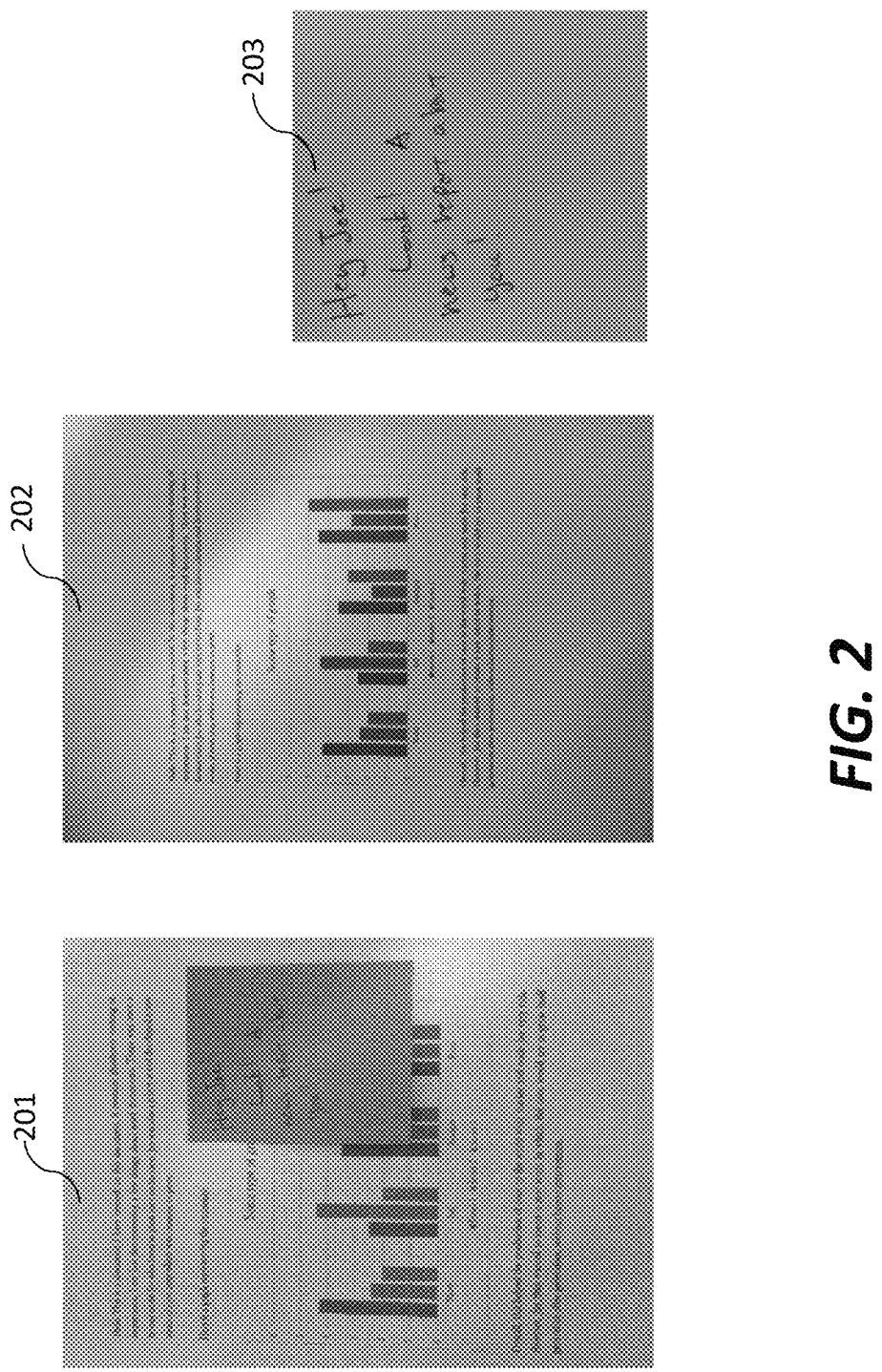
FIG. 2 depicts three images resulting from the scanning unit of FIG. 1 scanning the document with an attached sticky note of FIG. 1 in different scanning operations.

FIG. 2 illustrates first, second and third scanned documents 201, 202, and 203, scanned by the scanning unit 118, and either saved in the memory 110, or in a memory of the computing device 114. The first, second and third documents 201, 202, and 203 may be of format such as PDF, typical for image data output from scanners, or may be OCR-converted into a DOC or other text file. As illustrated, the first scanned document 201 is obtained by scanning the document 102 with the note 104, the second scanned document 202 is obtained by scanning only the document 102, and the third scanned document 203 is obtained by scanning only the note 104.

Figure 3:
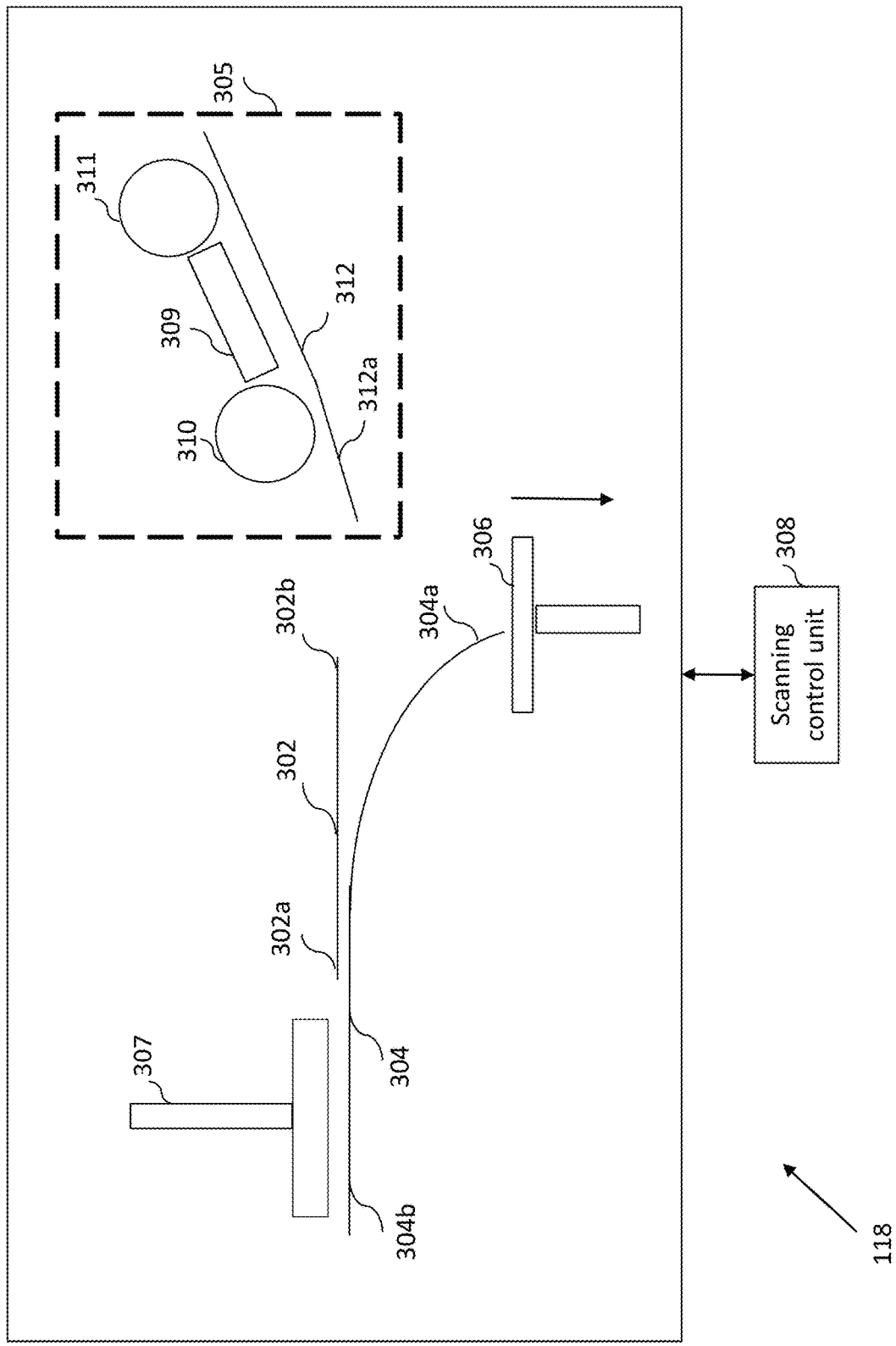
FIG. 3 is a sectional diagram schematically representing features of the scanning unit, including a document-edge bearing device, a document restraining assembly, and a pivotal scanning device, as functioning to process a sticky note attached to a document.

FIG. 3 illustrates details of the scanning unit 118 for processing a scanning-object note 302 (simply "note 302" hereinafter) detachably attached to a scanning-object document 304 (simply "document 304" hereinafter), in accordance with an embodiment of the presently disclosed technology. The edge of the note 302 detachably attached to the document 304 is an adhesive edge 302a, which is on the opposite end of the remaining, non-adhesive portion of the note 302 from what is herein termed its free edge 302b.

The scanning unit 118 includes a pivotal scanning device 305, a document-edge bearing device 306 abutting on a first end 304a of the document 304, and a document restraining assembly 307 pressing a second end 304b of the document 304 against a not-shown document-carrying table. It should be understood that the document-carrying table may be the platen-glass component itself of the scanning unit 118, in which case the platen-glass/document-carrying table is elevatable to allow the document-edge bearing device 306 to carry out its below-described function. Otherwise, the document-carrying table is separate from the platen glass, in which case the document-carrying table may be provided endwise-adjacent to the platen glass, document-feed flow downstream from the platen glass. In either case, the document 304 is fed on to the document-carrying table itself or onto the combined platen-glass/document-carrying table by a known document-feeding mechanism commonly employed in automatic document feeders in MFPs. As indicated in FIG. 3, the scanning unit 118 further includes a scanning control unit 308 for controlling the operations of the pivotal scanning device 305, the document-edge bearing device 306, and the document restraining assembly 307. The scanning control unit 308 may be the above-described CPU 112 executing software, firmware, and/or other instructions, either stored in the memory 110 or in a computer-readable recording medium, dedicated to carrying out scanning unit 118 control functions and algorithms described below. Alternatively, the scanning control unit 308 may be a separate computer processor executing software, firmware, and/or other instructions, either stored in a not-illustrated memory or in a computer-readable recording medium, dedicated to preconfigured to carry out the below-described scanning unit 118 control functions and algorithms.

As noted earlier, the scanning control unit 308 is operatively linked to appropriately disposed sensors (not illustrated), wherein the scanning control unit 308 is enabled for detecting presence of a document on the platen glass. It will be appreciated that thus, the scanning control unit 308 is likewise enabled for detecting presence of a document on the document-carrying table, if separate from the platen glass.

Figure 4:
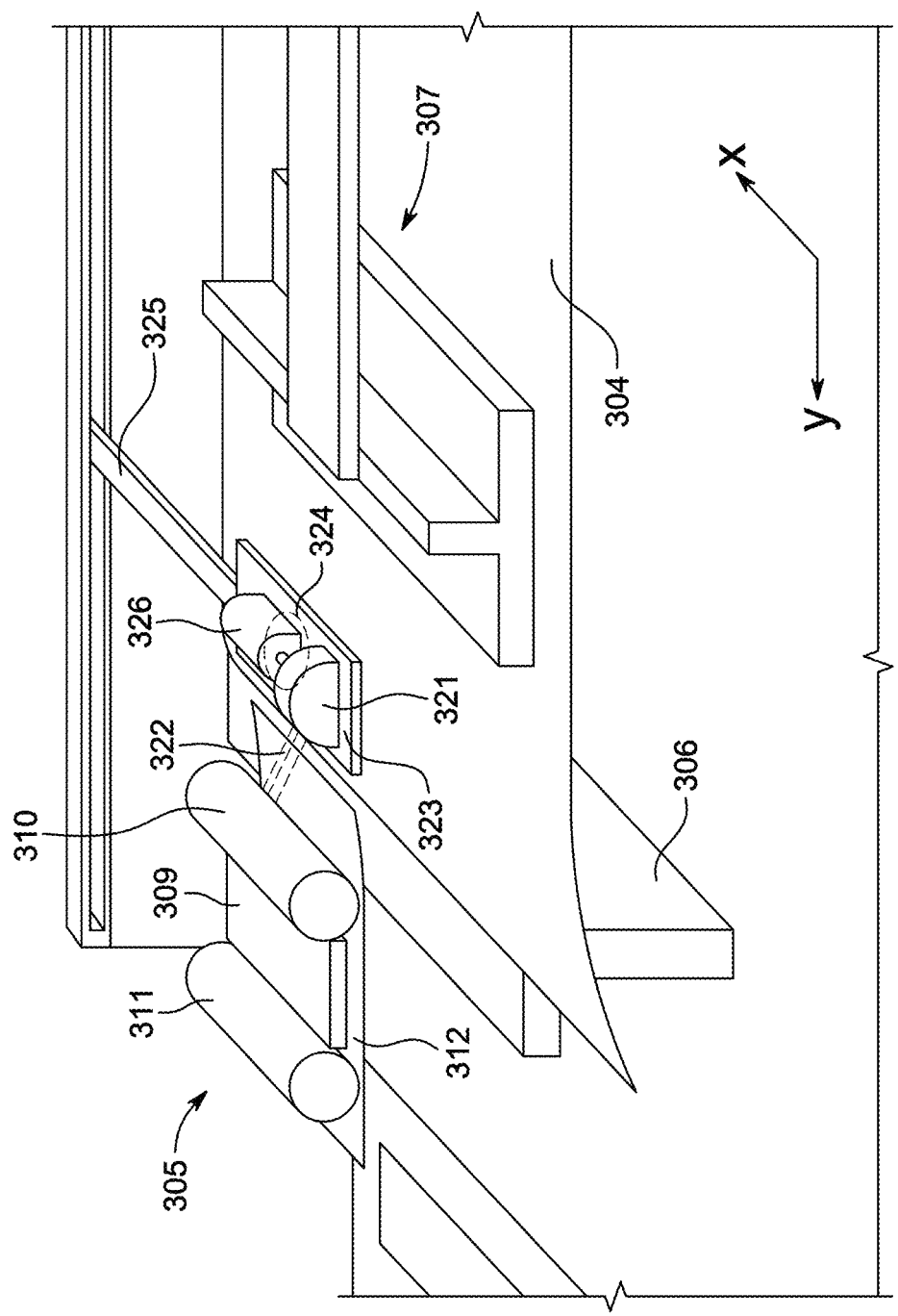
FIG. 4 is an isometric view of the scanning unit, in place over the scanning area of an MFP, scanner, printer, or the like, including the pivotal scanning device with associated positioning and pivoting mechanisms and with the document-edge bearing device and document restraining assembly, in operation over, as received in the scanning unit, a document from which the pivotal scanning device removes and scans a not-shown sticky note.

As illustrated in FIG. 4, the pivotal scanning device 305 is mounted on a support arm 322 retained in a scanning mount 321 to pivot in a plane perpendicular to the plane of the document being scanned. The mount 321 is disposed on a note-targeting platform 323 that is carried on a swivel fixture 324 linked to a support arm 325 that is translatable widthwise and lengthwise with respect to the document. The swivel fixture 324 is swiveled, and the support arm 325 is translated, within a plane parallel to the document being scanned by, respectively, a not-shown stepper motor and a not-shown rack-and-pinion, servomotor-driven support-arm translating mechanism, both of which are controlled by the scanning control unit 308 in response either to detection information obtained by the scanning control unit 308 from an advance scanning of the document 304 by scanning hardware beneath the platen glass or combined platen-glass/document-carrying table, as described further below, or to detection information received from a later-described sensor 410. A pivot-drive motor 326 which in some implementations may be a stepper motor, and in other implementations may be a servomotor, drives the support arm 322 to pivot the pivotal scanning device 305, while the swivel fixture 324 includes a not-shown stepper motor to swivel the note-targeting platform 323 within a range of up to 180 degrees in the plane of the note-targeting platform 323. The pivot-drive motor 326, the support-arm translating mechanism for translating the support arm 325, and the stepper motor driving the swivel fixture 324 are control-operatively linked to the scanning control unit 308. It will be appreciated that thus, the pivotal scanning device 305 is situatable into any (x, y) position with respect to the document 304 along its widthwise x and lengthwise y directions.

The pivotal scanning device 305 includes a note-sheet scanner 309, first and second rollers 310 and 311 rotatably disposed on opposing lateral sides of the note-sheet scanner 309, and a note-wedging guide 312, coated with silicone or other slippery (non-stick) coating, beneath the note-sheet scanner 309. The note-wedging guide 312 may have an upturned or bent leading edge 312a to assist in the guide being slid under the free edge 302b of the note 302. In certain embodiments of the scanning unit 118, the note-sheet scanner 309 is an auxiliary part of a sheet-fed scanning system that, similarly to conventional scanners, is configured by scanning hardware together with control functionality, executed by the scanning control unit 308 for example, to irradiate a document placed on the platen glass or combined platen-glass/document-carrying table with scanning light from a light source, optically read the document based on the reflected light, and convert the optical image into an electric signal, thereby generating imaging data for digitalized reproduction of the document. In such embodiments, accordingly, the position of the note 302 on the document 304 may be determined based on a copy of the document 304 scanned conventionally in advance, with the note 302 attached. This OCR-based method of determining the location of the note 302 relative to the document 304 is described hereinabove. In these implementations of the scanning unit 118, the controlling by the scanning control unit 308 of the not-shown stepper motor to swivel the swivel fixture 324 and of the not-shown rack-and-pinion, servomotor-driven support-arm translating mechanism to translate the support arm 325 is carried out based on such detection information obtained from the digitalized reproduction of the document obtained by its aforementioned advance, conventional scanning. The scanning unit 118 of such embodiments preferably is configured with the aforementioned elevatable combined platen-glass/document-carrying table, with the note-targeting platform 323 on its x-y translatable support arm 325 and the pivotal scanning device 305 that the note-targeting platform 323 carries being disposed over the platen-glass/document-carrying table.

The document-edge bearing device 306 is configured to drop perpendicularly away from the first edge 304a of the document 304 to allow the first edge 304a to droop under its own weight, and the document restraining assembly 307 is configured to keep the second edge 304b of the document 304 in a flat position. It will be understood that the first and second edges 304a and 304b in the FIG. 3 illustration are the longitudinal ends of the document 304, wherein the first edge 304a is relatively nearer the free edge 302b, and the second edge 304b is relatively nearer the adhesive edge 302a. The first edge 304a of the document 304 drooping under its own weight opens a gap between the free edge 302b of the note 302 and the document 304, exposing the free edge 302b.

The first and second rollers 310 and 311 are rotated at predetermined speeds in a first direction (either clockwise or counterclockwise) and in a second, opposite direction (either counterclockwise or clockwise) to draw the note 302 across the note-sheet scanner 309. For example, a not-shown drive train linked to a not-shown motor on the note-wedging guide 312 may be employed to rotate the rollers 312 accordingly. In the presently described embodiment, the scanning control unit 308 is configured to control the speed and direction of rotation of the first and second rollers 310 and 311. The scanning control unit 308 thus controlling the direction and speed of the first and second rollers 310 and 311 enables the pivotal scanning device 305 to catch the free edge 302b, and draw the note 302 towards the note-sheet scanner 309, once the note-targeting platform 323 carrying the pivotal scanning device 305 has been situated into position over the note 302, as will be explained below.

Although the herein-described pivotal scanning device 305 has only two rollers 310 and 311, as will be apparent to one of ordinary skill in the art, more than two rollers may be employed to facilitate moving the note 302 across the note-sheet scanner 309 to carry out the scanning process. The note-wedging guide 312 is a plate whose roller-opposing surface may be coated with a sprayed- or painted-on membrane of silicone, or may be Teflon® coated or similarly surface-treated so that the adhesive edge 302a of the note 302 won't stick to the note-wedging guide 312.

Figure 5:
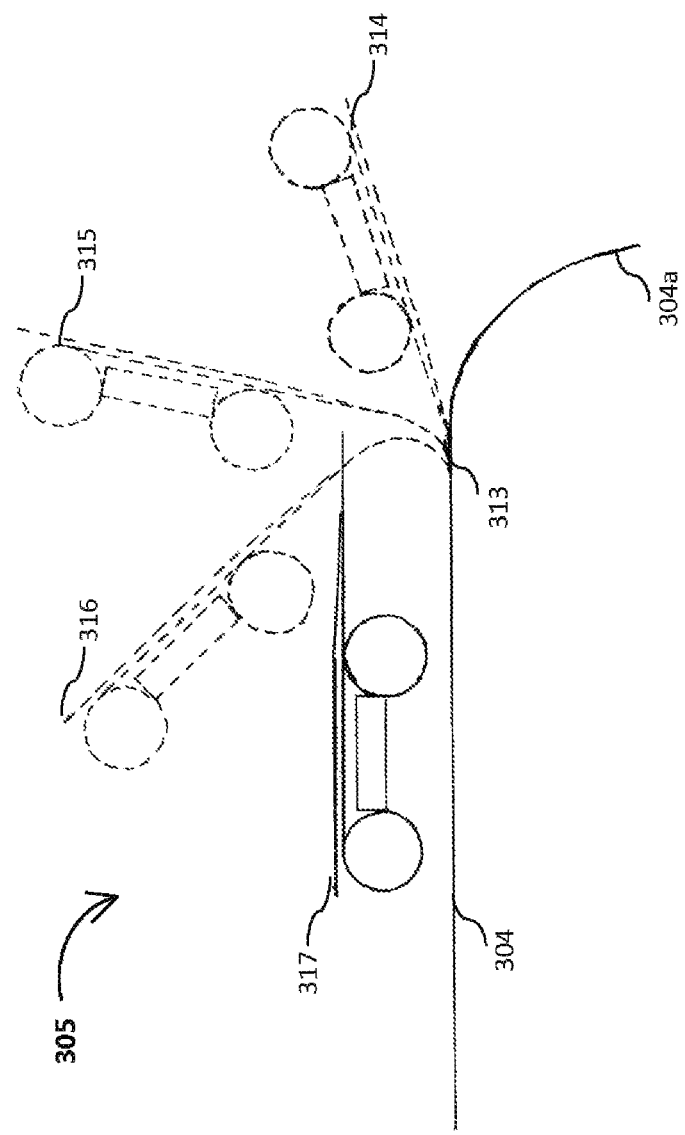
FIG. 5 is a sectional view illustrating the scanning-unit pivotal scanning device of FIGS. 3 and 4, pivoting in stages as it removes a not-shown sticky note.

FIG. 5 schematically depicts the pivotal scanning device 305 in accordance with embodiment of the presently disclosed technology in stages of pivoting from having caught the free edge 302b of the note 302, through to having been turned upside-down to peel the note's adhesive edge 302a off of the document 304. In implementations in which the pivot-drive motor 326 is a stepper motor, the motor 326 is controlled by the scanning control unit 308 to pivot the support arm 322, and thus the pivotal scanning device 305 as a whole, around a pivot point 313 in stepwise fashion, for example, first through fourth positions 314 to 317. In implementations in which the pivot-drive motor 326 is a servomotor, the motor 326 is controlled by the scanning control unit 308 to pivot the scanning apparatus 305 continuously rather than stepwise. In either case, the scanning control unit 308 is configured to control the pivot-drive motor 326 appropriately so as to pivot the pivotal scanning device 305 from the sticky-note free-edge engaging position, to the sticky-note removal position where the pivotal scanning device 305 is flipped over.

In its first, or resting, position 314 the pivotal scanning device 305 is manipulated so as to wedge the note-wedging guide 312 under the free edge 302b of the sticky note 302. In its fourth, or scanning-operational, position 317 the pivotal scanning device 305 is inverted, wherein it has peeled the sticky note 302 completely off the document 304 and wherein the scanning control unit 308 drives the first and second rollers 310 and 311 to draw the sticky note 302 over a not-shown scanning window in the note-sheet scanner 309 to optically scan text and/or graphic information from the note 302. Accordingly, the scanning unit 118 is configured to rotate the pivotal scanning device 305 in a direction away from the first edge 304a of the document 304 to swing from the first position 314 to the fourth position 317, and further to rotate in a direction towards the first edge 304a to swing from the fourth position 317 to the first position 314.

Figure 6A:
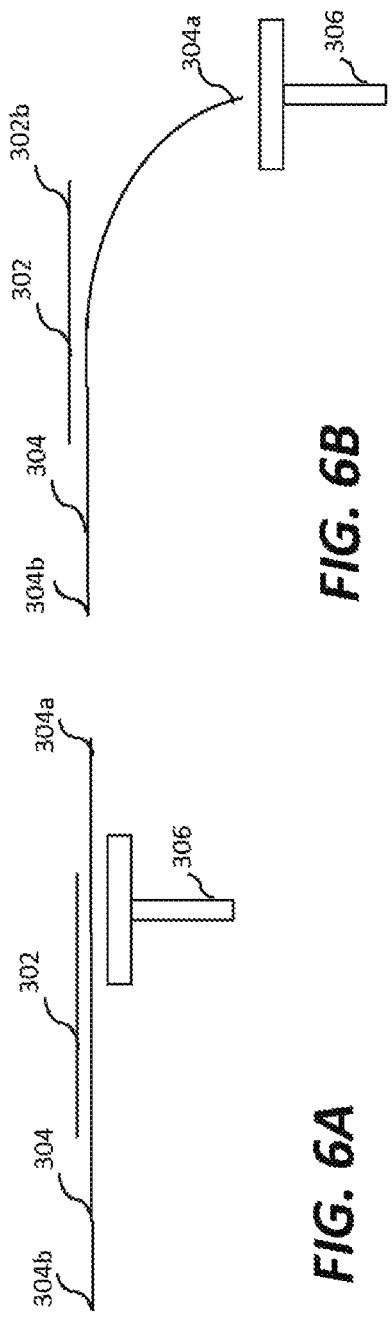
FIGS. 6A-6E are schematic sectional diagrams illustrating different stages of the scanning process performed by the scanning unit of FIGS. 1, 3 and 4.
Figure 6B:
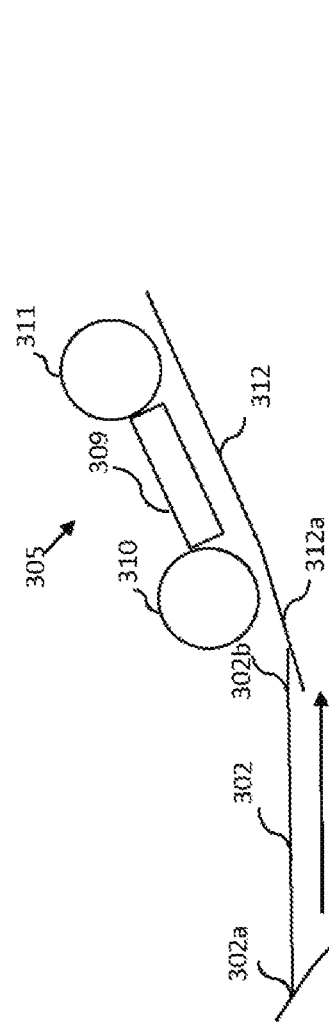

In operation, when the document 304 is submitted for the scanning, the first edge 304a is in a flat position (FIG. 6A), and the scanning control unit 308 enables scanning of the document 304 with the note 302. When the user provides their affirmation regarding presence of a sticky note 302 on the document 304, and scanning of the sticky note 302 and the document 304 individually, the scanning control unit 308 enables lowering down of the document-edge bearing device 306 (FIG. 6B) based on a position of the note 302 on the document 304. As explained earlier, movement of the document-edge bearing device 306 perpendicularly away from the first edge 304a of the document 304 allows the first edge 304a to droop. The first edge 304a thereby curves off the document 304, exposing the free edge 302b of the note 302.

Figure 6C:
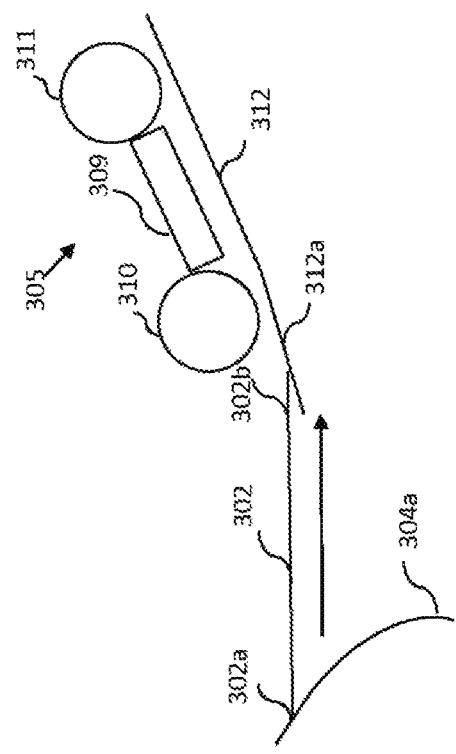

Referring to FIG. 6C, the scanning control unit 308 is configured to push the document 304 towards the first roller 310, such that only the free edge 302b comes into contact with the first roller 306 due to curved position of the first edge 304a. Herein, the pivotal scanning device 305 is shown to be in the first position 314 (FIG. 5), which may be termed its steady-state position.

Figure 6E:
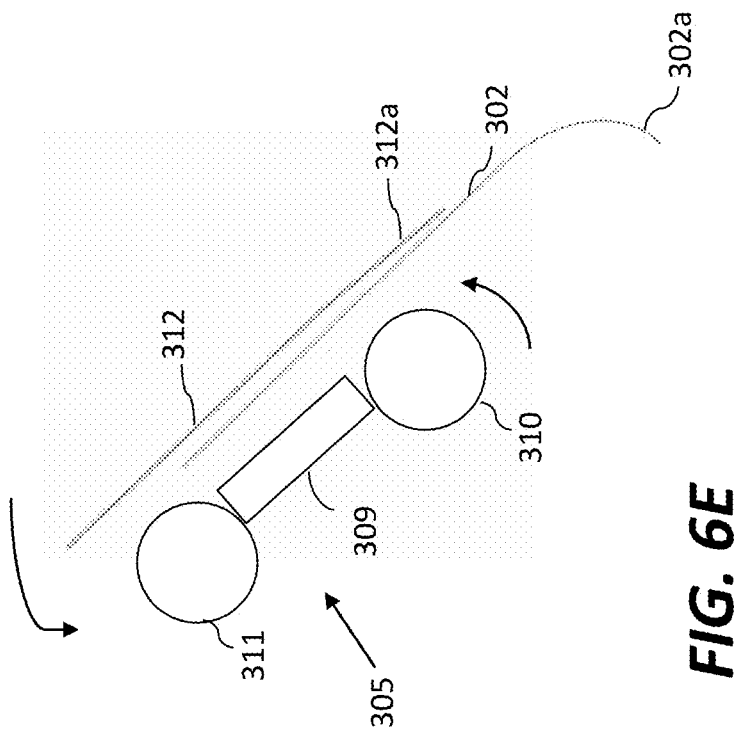
Figure 6D:
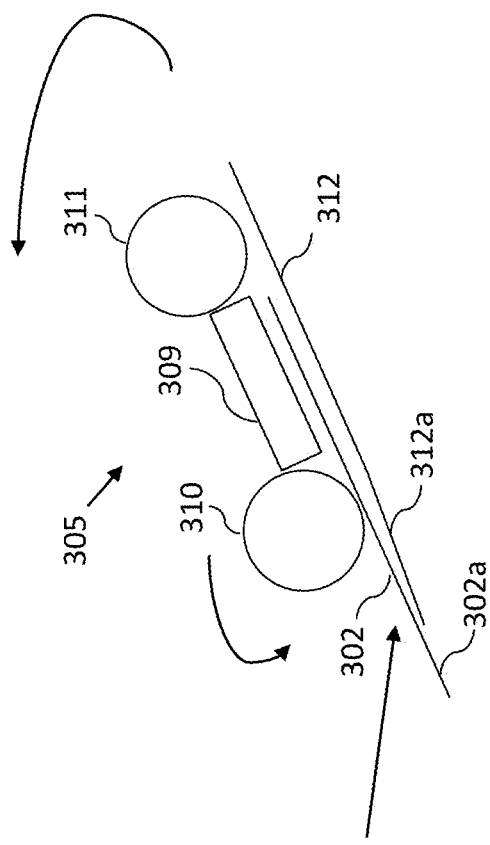

FIG. 6D illustrates movement of the note 302 towards the note-sheet scanner 309 for the purpose of scanning. Herein, the first and second rollers 310 and 311 rotate about their axis counterclockwise, as depicted in the figure, to pull the note 302 under the note-sheet scanner 309 for scanning. In the present embodiment, as soon as the first and second rollers 310 and 311 start rotating to initiate scanning of the note 302, the pivoting scanning apparatus 305 also starts pivoting counterclockwise. In the illustrated example, the pivoting scanning apparatus 305 is shown, in FIG. 6D, to be on its way to the second position 315 of FIG. 5. FIG. 6E illustrates the pivotal scanning device 305 on its way from the third position 316 of FIG. 5, for detaching the adhesive edge 302a of the note 302 from the document 304. The counterclockwise pivoting of the scanning apparatus 305 and of the first and second rollers 310 and 311 provides a leveraging force that gently peels the adhesive edge 302a from the document 304, once the note 302 is caught between the rollers 310 and 311, and the note-wedging guide 312.

As the note 302 moves towards the second roller 311, it is also being simultaneously scanned by the note-sheet scanner 309. In some embodiments of the presently disclosed technology, after the scanning of the note 302 is completed, the document 304 may also be scanned independently by the note-sheet scanner 309.

FIG. 7 illustrates reattachment of the note 302 to the document 304 after the scanning of the note 302 is completed, in accordance with certain embodiments of the presently disclosed technology. Herein, the pivotal scanning device 305 is shown to be in the first position 314 (FIG. 5), i.e. steady state position. In embodiments enabling a user to provide affirmation regarding reattaching of the note 302 to the document 304, the scanning control unit 308 directs the first and second rollers 310 and 311 to rotate in the rotational direction opposite from the first rotational direction, so as to push the note 302 away from the note-sheet scanner 309, and back towards its original position on the document 304. It will be appreciated that pivotal motion of the pivotal scanning device 305 does not take place during the reattachment of the note 302 to the document 304. In embodiments in which the scanning unit 118 is enabled for reattaching the note 302 to the document 304, the scanning unit 118 further includes a retractable presser roller 318 that for example is carried on a not-shown rack-and-pinion mechanism driven by a not-shown stepper motor or servomotor, to press the adhesive edge 302*a* of the note 302 onto the document 304 to reattach the note 302 to the document 304, when the note 302 arrives back at its original position on the document 304.

Thus, advantageous benefits the presently disclosed technology can achieve in various embodiments include any or all of: eliminating the need to remove the sticky note 302 from the document 304 manually, eliminating the need to scan the sticky note 302 manually, or eliminating the need to reattach the sticky note 302 to the document 304 manually after it has been removed.

In other embodiments, a scanning unit 118 of the present disclosure may employ a sticky note waste basket, if the user chooses to have the sticky note 302 removed permanently from the original document 304.

Figure 8:
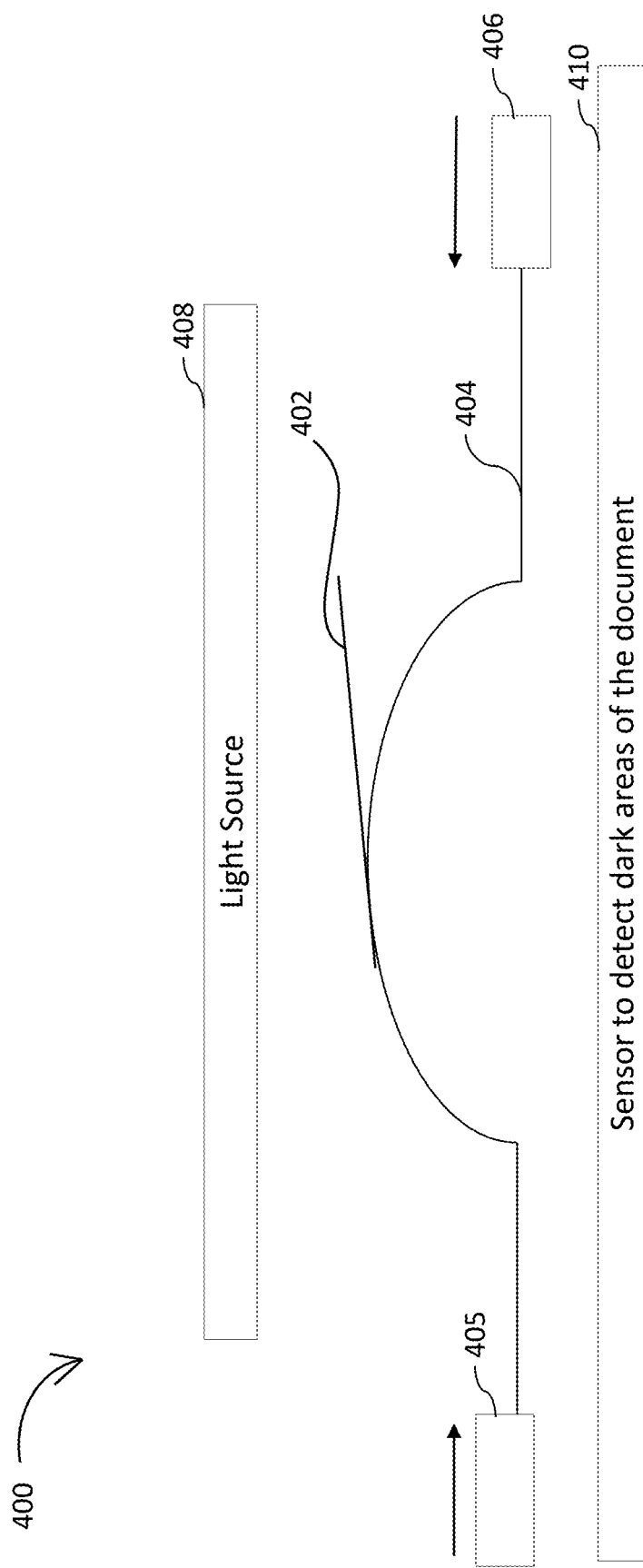
FIG. 8 schematically represents a note detection assembly for automatically detecting if a sticky note is physically present on a document, in accordance with certain embodiments of the presently disclosed technology.

FIG. 8 illustrates a note detection assembly 400 for distinguishing whether a note feature 402 on a document 404 is a physically separate note sheet or is a printed image (e.g., a photocopied sticky note) that is a graphical feature of the physical document 404. In certain embodiments of the presently disclosed technology, the note detection assembly 400 may be optionally added to the scanning unit 118, and operatively connect to, for being controlled by, the scanning control unit 308, for automatically distinguishing the type of note feature 402 on the document 404. In certain implementations as described above, the user may give affirmation regarding presence of a sticky note on the document 404. However, the note may not be a physical note, and may be a printed image of same. Thus, the note detection assembly 400 facilitates verification of user response regarding sticky note. The note detection assembly 400 may also facilitate automatic detection of the sticky note on the document, as soon as the document is submitted for scanning.

In certain embodiments of the presently disclosed technology, the note detection assembly 400, provided in a sheet-fed scanning system of configuration as described earlier, includes first and second sheet-wrinkling sliders 405 and 406 deployed at left and right sides of the platen glass, constituting a document-sheet wrinkling mechanism for sliding against the document 404 along its opposing left and right edges to wrinkle the document 404 so as to create an arch in it. When the note feature 402 is a physical note stuck on the document 404, then a gap will thus be created between the non-adhesive, free end of the note feature 402 and the region of the document 404 immediately beneath the free end. It will be appreciated that a single sheet-wrinkling slider unilaterally sliding the document against a diametrically opposing, stationary retainer could be employed as the document-sheet wrinkling mechanism to similar effect.

In some embodiments of the presently disclosed technology, the note detection assembly 400 further includes a light source 408 to cast light on the note feature 402, and a sensor 410 to determine the darkness of the shadow created by the free end of a physical note feature 402 having been arched by the first and second sheet-wrinkling sliders 405 and 406, although in other embodiments the light source 408 may be ambient light, such as light from a ceiling light fixture. By the sensor 410 sensing the darkness of the shadow created by the note feature 402, the note detection assembly 400 concludes whether the note feature 402 is a physical sticky note or a printed/photocopied image of a sticky note, and provides information to the scanning control unit 308 indicating the conclusion.

The sensor 410 may also function dually also to detect the position of the above-discussed note 302, or note feature 402 (when the note detection assembly 400 determines that the note feature 402 is a physical note), relative to the document 304/404. The sensor 410 in being control-operatively linked to the scanning control unit 308 can provide the scanning control unit 308 with information identifying the position of the note 302/402. Based on that information, the scanning control unit 308 controls the not-shown rack-and-pinion, servomotor-driven mechanisms to translate the support arm 325 so as to position the pivotal scanning device 305 widthwise and lengthwise with respect to the document into a location where the note-wedging guide 312 may be slid beneath the free edge 302*b* of the note 302/402, by appropriate further control of the support-arm translating mechanism by the scanning control unit 308. It will be appreciated that in lieu of the just-described dual functioning of the sensor 410, a separate sensor dedicated to detecting the position of the note 302/402 relative to the document 304/404 may be provided.

Figure 9:
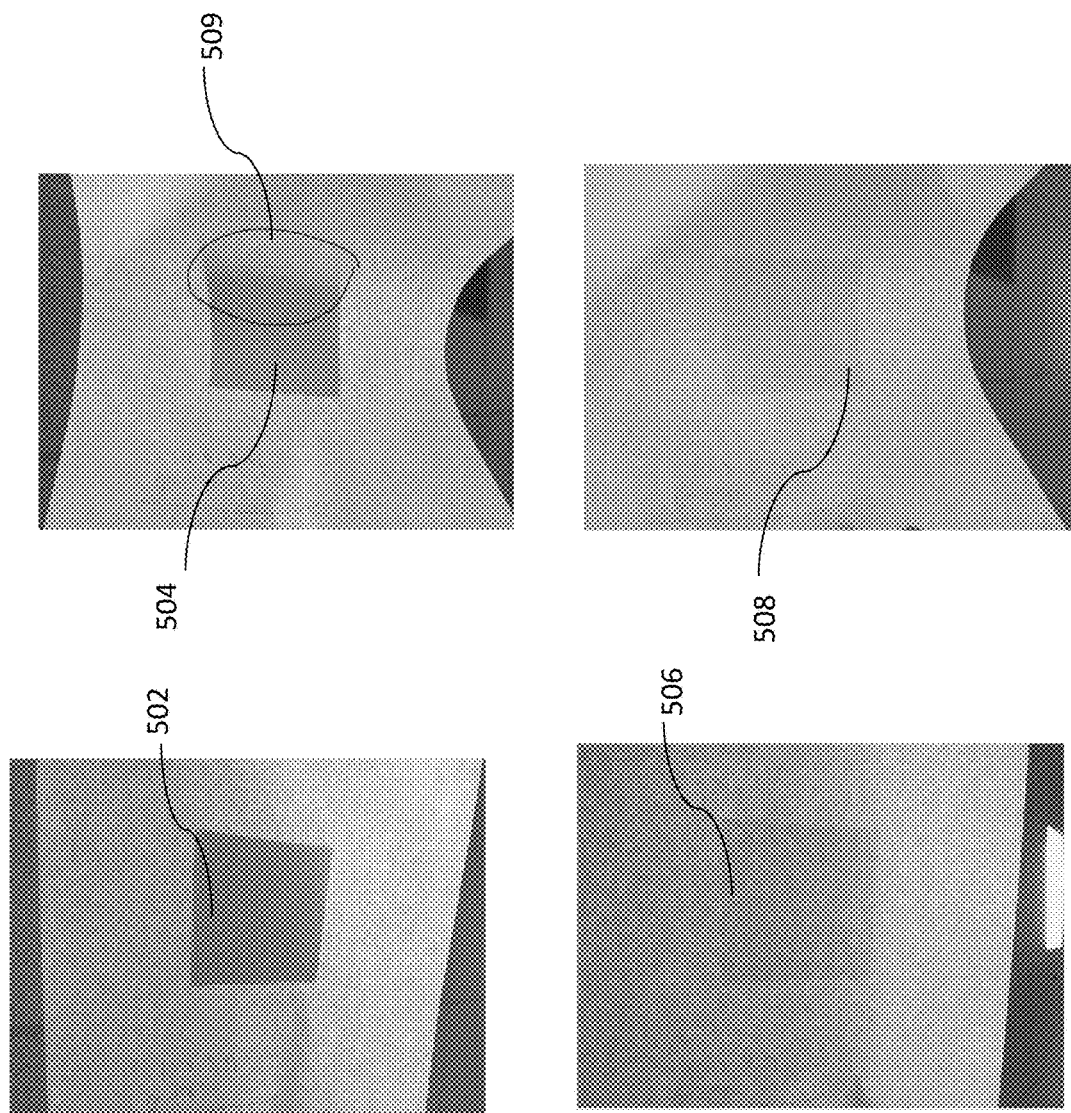
FIG. 9 presents images of physical and copied sticky notes generated by the note detection assembly before and after arching of a corresponding document.

FIG. 9 depicts two corresponding pairs of images of, respectively, a physical note and a printed/photocopied note, indicating the shadowing presented to the sensor 410 before and after arching of corresponding document using the first and second sheet-wrinkling sliders 405 and 406. In this example, first and second images 502 and 504 correspond to the physical sticky note before and after wrinkling of the document into an arch. On the other hand, third and fourth images 506 and 508 correspond to the printed/photocopied sticky note before and after wrinkling of the document into an arch. It can be seen that when the document 502 is arched, by the physical sticky note 504 diffuses a distinct amount of light, as distinct from the printed/photocopied sticky note 508, which does not diffuse any light. That is, the second image 504 includes a gray area 509 that is lighter relative to the shadow underneath, because the free end of the physical sticky note peeled off the wrinkle-arched document blocks out light, casting a shadow on the document around the free end. In contrast, in the fourth image 508, the printed/photocopied sticky note, being made of toner/ink, does not affect the amount of light being diffused. Thus, based on the light diffusion and shadow region, the sensor 410 can distinguish between physical and printed/photocopied sticky notes.

Figure 10A:
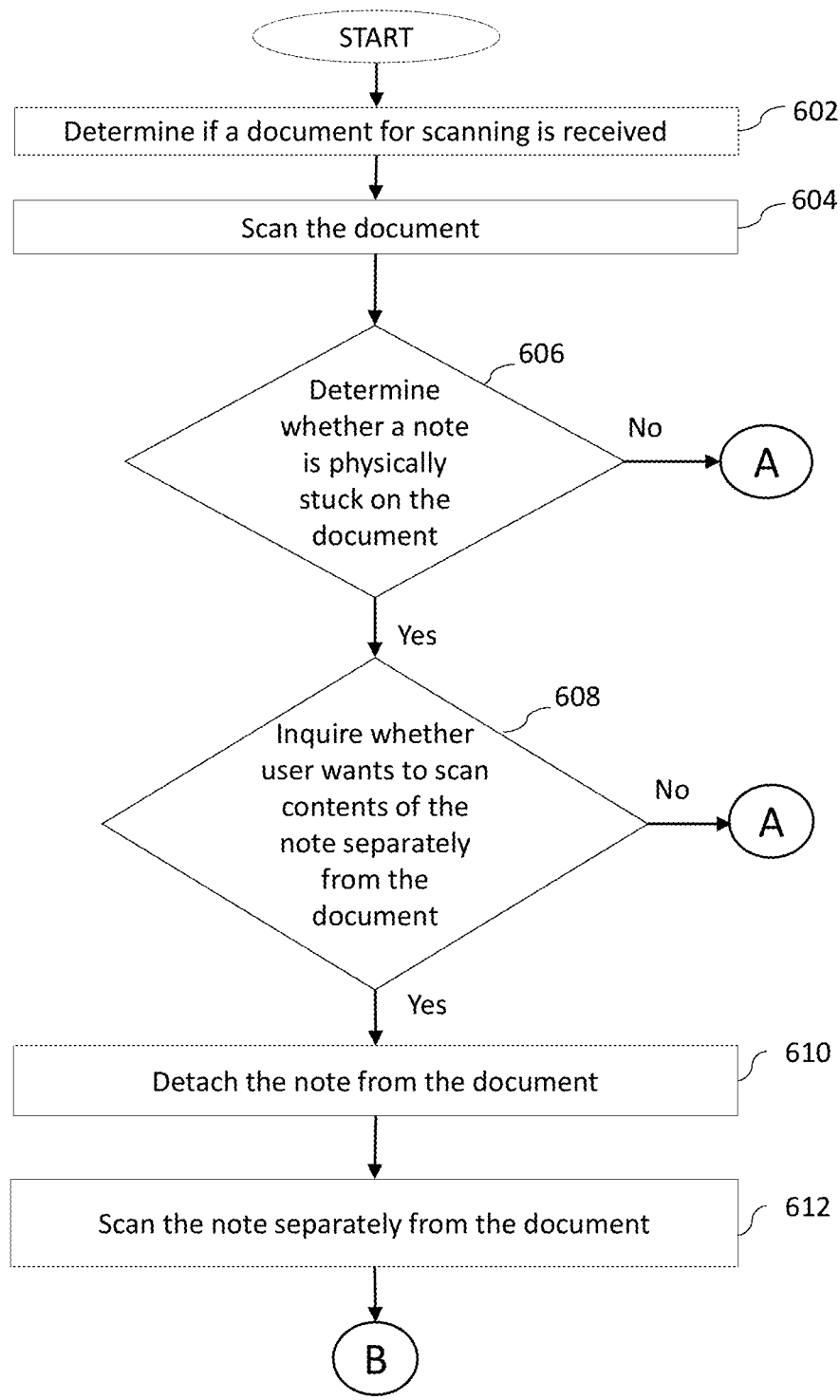
FIGS. 10A and 10B are flowcharts illustrating a sticky-note remove/scan/reattach method, in accordance with certain embodiments of the presently disclosed technology.
Figure 10B:
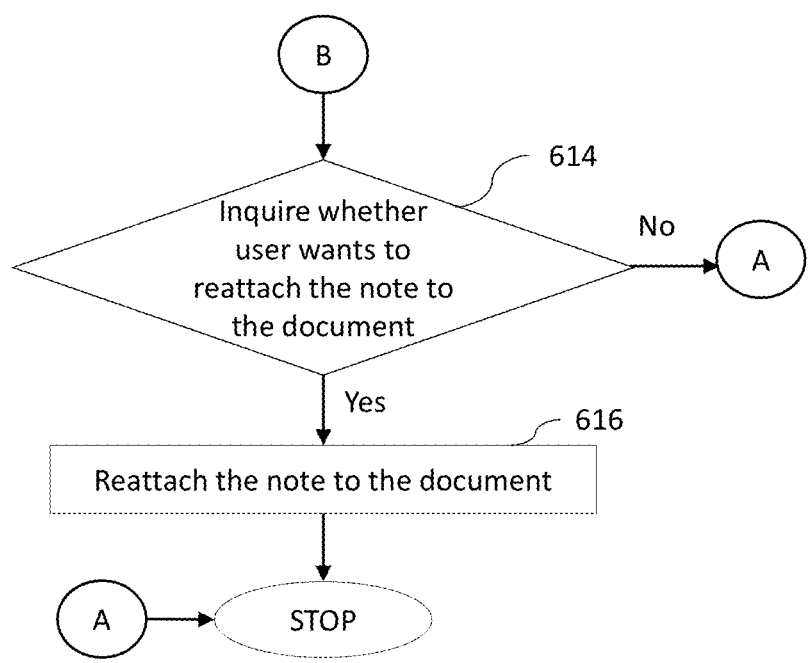

FIG. 10 is a flowchart illustrating flow of a note-removal/note-scanning/note-reattaching process carried out by the scanning unit 118 of the image forming apparatus 100, according to embodiments of the presently disclosed technology. The note-removal/note-scanning/note-reattaching process may be best understood in reference to all the earlier-cited FIGS. 1-9.

At step 602, the presence of a document (e.g., the document 302) is awaited for scanning is detected by the scanning unit 118, or otherwise the scanning unit 118 is alerted of the document's presence.

At step 604, the document 302 is scanned by the scanning unit 118, producing scanned-document data. The scanned-document data may be saved in the memory 110 of the image forming apparatus 100.

At step 606, it is checked if a note 304 is physically stuck on the document 302. As described earlier, in some embodiments, the operation panel 108 may be configured to ask the question "Does the document include a sticky note?" As also described earlier, in some embodiments, the presence of the rectangular form of the note may be determined from the scanned-document data. In still other embodiments, the above-described note detection assembly 400 (reference is made to FIG. 8) may facilitate automatic detection of such sticky note as soon as the corresponding document to which the note is adhered is submitted for scanning.

At step 608, it is checked if the user wants to scan contents of the note 302 separately from the document 304. As described earlier, in some embodiments, the operation panel 108 may be configured to ask the user "Scan note separately from document?"

At step 610, the note 302 is detached from the document 304. This process, carried out by the scanning unit 118 including the pivotal scanning device 305, for detaching the note 302 from the document 304 has been described earlier, with reference to FIGS. 3 through 6. The accordingly controlled pivotal motion of the scanning apparatus 305 enables quick and efficient detachment of the note 302 from the document 304.

At step 612, the note 302 is scanned separately from the document 304 by the scanning unit 118, and the scanned-note data is for example stored in the memory 110, or at the user computing device 114.

At step 614, it is checked if the user wants to reattach the note 302 to the document 304. In certain embodiments of the presently disclosed technology, the operation panel 108 may be configured to ask user "Reattach note to document?" At step 616, the note 302 is reattached to the document 304. As described earlier, in some embodiments, the scanning unit 118 includes the retractable presser roller 318 (FIG. 4) for reattaching the note 302 to the document 304.

It should be noted that throughout the disclosure, numerous references may be made regarding servers, services, engines, modules, interfaces, portals, platforms, or other systems formed from computing devices. It should be understood that the use of such terms is deemed to represent one or more computing devices having at least one processor configured to or programmed to execute software instructions stored on a computer-readable tangible, non-transitory medium or also referred to as a processor-readable medium. For example, a server can include one or more computers operating as a web server, database server, or another type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

It should be understood, however, that all of these and similar terms are to be associated with the appropriate physical quantities and are merely convenient labels applied to these quantities. Unless specifically stated otherwise, as apparent from the discussion herein, it will be appreciated that throughout the description, discussions utilizing terms such as "receiving," or "authenticating," or "facilitating," or "executing," or "capturing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Further, the terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A scanning unit for scanning a document received therein, the document having a removable note sheet attached to the document along an adhesive edge of the removable note sheet, the removable note sheet having a free edge opposite the adhesive edge thereof, the scanning unit comprising:
    a platen for carrying the document;
    scanning hardware disposed beneath the platen, for scanning the document to generate imaging data containing note-sheet position information indicating position of the removable note sheet relative to the document;
    a note-targeting platform disposed over the platen and mounted on a support arm translatable widthwise and lengthwise with respect to the document, and enabled to swivel in a plane parallel to the document;

a pivotal scanning device carried pivotably on the note-targeting platform to pivot in a plane perpendicular to the document, the pivotal scanning device including
  a note-sheet scanner,
  first and second rollers rotatably disposed on opposing lateral sides of the note-sheet scanner, each enabled to rotate at a predefined speed in a predefined direction, to move the removable note sheet across the note-sheet scanner, and
  a note-wedging guide carrying the note-sheet scanner and the first and second rollers, the note-wedging guide having a leading edge;
a document-edge bearing device for bearing an edge of the document nearest the free edge of the removable note sheet, the document-edge bearing device being shiftable perpendicularly away from the document with respect to the document; and
a central processing unit configured as a scanning control unit, the scanning control unit control-operatively linked to the scanning hardware, and to the note-targeting platform and the pivotal scanning device, for controlling according to the note-sheet position information the translating and swiveling of the note-targeting platform relative to the document, for controlling the pivoting of the pivotal scanning device, and for controlling the note-sheet scanner, and first and second rollers, and the scanning control unit further being control-operatively linked to the document-edge bearing device; wherein
the scanning control unit is configured to
  shift the document-edge bearing device perpendicularly away from the document to allow the edge of the document nearest the free edge of the removable note sheet to droop under its own weight and open a gap between the free edge of the removable note sheet and the document, exposing the free edge,
  based on the note-sheet position information from the scanning hardware, translate and swivel the note-targeting platform to situate the leading edge of the note-wedging guide in the gap between the free edge of the removable note sheet and the document,
  further translate and swivel the note-targeting platform to move the note-wedging guide under the removable note sheet, while rotating the first and second rollers in a first direction, to catch the free edge of the removable note sheet between the first and second rollers and the note-wedging guide and pull the removable note sheet towards the note-sheet scanner,
  pivot the pivotal scanning device, while continuing to rotate the first and second rollers in the first direction, to pull the removable note sheet away from the document and peel the adhesive edge of the removable note sheet off of the document, detaching the removable note sheet from the document, and
  operate the note-sheet scanner while further rotating the first and second rollers, to scan the entirety of the detached removable note sheet.

2. The scanning unit of claim 1, further comprising a retractable presser roller, wherein the scanning control unit is configured to, when the scanning of the detached removable note sheet is complete, rotate the first and second rollers in a second direction opposite from the first direction to replace the detached removable note sheet in its original position on the document, and to cause the presser roller to pressure-roll on the adhesive edge of the removable note sheet onto the document to reattach the removable note sheet to the document.

3. The scanning unit of claim 1, further comprising a sheet-fed scanner including:
  a platen for carrying the document; and
  scanning hardware for scanning the document to generate imaging data.

4. The scanning unit of claim 1, wherein the note-wedging guide is surface-coated with a non-stick substance.

5. The scanning unit of claim 1, wherein the leading edge of the note-wedging guide is upturned.

6. The scanning unit of claim 1, further comprising a document restraining assembly for superficially pressing on the document along an end thereof opposite the edge of the document nearest the free edge of the removable note sheet.

7. A multifunction peripheral comprising the scanning unit of claim 1.

8. The multifunction peripheral of claim 7, further comprising:
  an operation panel including a user interface for receiving one or more user commands and instructions, and outputting one or more options for selection by a user; and
  a memory for storing one or more instructions for use by the scanning control unit, and user information of one or more users.

9. A sheet-fed scanning system for scanning documents having note features, the note features including removable note sheets document-attached along an adhesive edge of the removable note sheet and having a free edge opposite the adhesive edge thereof, and printed images of note sheets, the sheet-fed scanning system comprising:
  a document-carrying platen;
  a note detection assembly for distinguishing whether a note feature on a document is a physically separate, removably attached note sheet or is a printed image, the note detection assembly including
    a document-sheet wrinkling mechanism having at least one sheet-wrinkling slider disposed unilaterally along the platen for unilaterally sliding against a document carried on the platen to wrinkle the document so as to create an arch in the document, thereby forming a shading-difference-originating gap between the free edge of any removable note sheet attached to the document, and an opposing surface of the document, and
    a sensor for detecting a gap-originated shading difference between an edge of an area of contrast detectable as a note feature on a document, and a predetermined region surrounding the note feature, wherein the sensor determines position of the note feature relative to the document widthwise and lengthwise and outputs the determination as note-sheet position information; and
  a scanning unit including
    a note-targeting platform disposed over the platen and mounted on a support arm translatable widthwise and lengthwise with respect to the document, and enabled to swivel in a plane parallel to the document,
    a pivotal scanning device carried pivotably on the note-targeting platform to pivot in a plane perpendicular to a document, the pivotal scanning device including
      a note-sheet scanner,
      first and second rollers rotatably disposed on opposing lateral sides of the note-sheet scanner, each enabled to rotate at a predefined speed in a predefined direction, to move a removable note sheet across the note-sheet scanner, and a note-wedging guide carrying the note-sheet scanner and the first and second rollers, the note-wedging guide having a leading edge, a document-edge bearing device for bearing an edge of a document nearest the free edge of a removable note sheet, the document-edge bearing device being shiftable perpendicularly away from the document with respect to the document, and a central processing unit configured as a scanning control unit, the scanning control unit control-operatively linked to the sensor, and to the note-targeting platform and the pivotal scanning device, for controlling according to the note-sheet position information the translating and swiveling of the note-targeting platform relative to the document, for controlling the pivoting of the pivotal scanning device, and for controlling the note-sheet scanner, and first and second rollers, and the scanning control unit further being control-operatively linked to the document-edge bearing device, wherein the scanning control unit is configured to shift the document-edge bearing device perpendicularly away from a document to allow the edge of the document nearest the free edge of the removable note sheet to droop under its own weight and open a gap between the free edge of the removable note sheet and the document, exposing the free edge, based on the note-sheet position information from the scanning hardware, translate and swivel the note-targeting platform to situate the leading edge of the note-wedging guide in the gap between the free edge of the removable note sheet and the document, further translate and swivel the note-targeting platform to move the note-wedging guide under the removable note sheet, while rotating the first and second rollers in a first direction, to catch the free edge of the removable note sheet between the first and second rollers and the note-wedging guide and pull the removable note sheet towards the note-sheet scanner, pivot the pivotal scanning device, while continuing to rotate the first and second rollers in the first direction, to pull the removable note sheet away from the document and peel the adhesive edge of the removable note sheet off of the document, detaching the removable note sheet from the document, and operate the note-sheet scanner while further rotating the first and second rollers, to scan the entirety of the detached removable note sheet.

10. The sheet-fed scanning system of claim 9, further comprising a light source control-operatively linked to the scanning control unit and disposed for casting light on a note feature on a document carried on the platen.

11. A multifunction peripheral comprising the sheet-fed scanning system of claim 9.

12. The multifunction peripheral of claim 11, further comprising:

an operation panel including a user interface for receiving one or more user commands and instructions, and outputting one or more options for selection by a user; and a memory for storing one or more instructions for use by the scanning control unit, and user information of one or more users.

13. A scanning unit for scanning a document received therein, the document having a removable note sheet attached to the document along an adhesive edge of the removable note sheet, the removable note sheet having a free edge opposite the adhesive edge thereof, the scanning unit comprising:

a note-targeting platform mounted on a support arm translatable widthwise and lengthwise with respect to the document, and enabled to swivel in a plane parallel to the document;

a pivotal scanning device carried pivotably on the note-targeting platform to pivot in a plane perpendicular to the document, the pivotal scanning device including a note-sheet scanner, first and second rollers rotatably disposed on opposing lateral sides of the note-sheet scanner, each enabled to rotate at a predefined speed in a predefined direction, to move the removable note sheet across the note-sheet scanner, and a note-wedging guide carrying the note-sheet scanner and the first and second rollers, the note-wedging guide having a leading edge;

a document-edge bearing device for bearing an edge of the document nearest the free edge of the removable note sheet, the document-edge bearing device being shiftable perpendicularly away from the document with respect to the document;

a central processing unit configured as a scanning control unit, the scanning control unit control-operatively linked to the note-targeting platform and to the pivotal scanning device, for controlling the translating and swiveling of the note-targeting platform relative to the document, for controlling the pivoting of the pivotal scanning device, and for controlling the note-sheet scanner, and first and second rollers, and the scanning control unit further being control-operatively linked to the document-edge bearing device; and a sensor disposed for detecting the position of the removable note sheet relative to the document widthwise and lengthwise, the sensor control-operatively linked to the scanning control unit; wherein the scanning control unit is configured to shift the document-edge bearing device perpendicularly away from the document to allow the edge of the document nearest the free edge of the removable note sheet to droop under its own weight and open a gap between the free edge of the removable note sheet and the document, exposing the free edge, based on removable-note position information from the sensor, translate and swivel the note-targeting platform to situate the leading edge of the note-wedging guide in the gap between the free edge of the removable note sheet and the document, further translate and swivel the note-targeting platform to move the note-wedging guide under the removable note sheet, while rotating the first and second rollers in a first direction, to catch the free edge of the removable note sheet between the first and second rollers and the note-wedging guide and pull the removable note sheet towards the note-sheet scanner, pivot the pivotal scanning device, while continuing to rotate the first and second rollers in the first direction, to pull the removable note sheet away from the document and peel the adhesive edge of the removable note sheet off of the document, detaching the removable note sheet from the document, and operate the note-sheet scanner while further rotating the first and second rollers, to scan the entirety of the detached removable note sheet.

14. A multifunction peripheral comprising the scanning unit of claim 13.

15. The multifunction peripheral of claim 14, further comprising:
- an operation panel including a user interface for receiving one or more user commands and instructions, and outputting one or more options for selection by a user; and
- a memory for storing one or more instructions for use by the scanning control unit, and user information of one or more users.

\* \* \* \* \*